United States Patent [19]

Stephenson, III

[11] Patent Number: 5,555,053
[45] Date of Patent: Sep. 10, 1996

[54] METERING APPARATUS

[75] Inventor: Stanley W. Stephenson, III, Spencerport, N.Y.

[73] Assignee: Eastman Kodak Company, Rochester, N.Y.

[21] Appl. No.: 286,025

[22] Filed: Aug. 4, 1994

[51] Int. Cl.$^6$ .............................. G03B 17/42; G03B 1/00
[52] U.S. Cl. ........................... 354/206; 354/213; 354/214
[58] Field of Search .................................. 354/204, 206, 354/213, 214

[56] References Cited

U.S. PATENT DOCUMENTS

| | | | |
|---|---|---|---|
| 3,724,348 | 4/1973 | Monks | 95/31 R |
| 4,223,990 | 9/1980 | Edwards | 354/204 |
| 4,437,749 | 3/1984 | Ehgartner et al. | 354/214 |
| 4,437,751 | 3/1984 | Engelsmann et al. | 354/214 |
| 4,914,462 | 4/1990 | Pagano | 354/213 |
| 4,948,063 | 8/1990 | Niedospial, Jr. | 242/71.1 |
| 5,008,692 | 4/1991 | Diehl et al. | 354/173.1 |
| 5,023,640 | 6/1991 | Diehl | 354/173.1 |
| 5,410,380 | 4/1995 | Kawamura et al. | 354/213 |

Primary Examiner—Michael L. Gellner
Assistant Examiner—Daniel Chapik
Attorney, Agent, or Firm—Peter J. Bilinski

[57] ABSTRACT

A metering apparatus for a filmstrip forms with at least one perforation for each film frame including a metering member which is configured for engaging at least one perforation for each film frame, so as to prevent the filmstrip from moving in a film advancing direction. According to the invention, the metering member includes at least one cam follower for contacting a trailing edge of a perforation to cam the metering member out of engagement with the filmstrip when the filmstrip is moved in an opposite film rewinding direction. The metering apparatus also includes a mechanism for retracting the metering member to allow the filmstrip to be subsequently advanced for film frame exposure. The retracting mechanism is mechanically coupled to the release of a high energy lever used for tripping the shutter blade of a camera so that advancement and exposure of the filmstrip can be controlled in a simple manner.

7 Claims, 7 Drawing Sheets

METERING APPARATUS

FIELD OF THE INVENTION

The invention relates generally to the field of photography, and in particular to an apparatus for mechanically advancing and metering a filmstrip in a frame by frame manner.

BACKGROUND OF THE INVENTION

Control of film advance in a camera can be done in a variety of ways. For example, there are known cameras having microprocessors with sufficient logic to provide a controlled and motorized frame by frame metering of the filmstrip. Sensing of frame registering perforations of the filmstrip in such systems can be done, such as by using optical sensors or other switching controls. These techniques and the use of motorized film advance mechanisms are quite expensive and significantly impact the cost of the camera into which they are incorporated.

Manually operated film advance systems are also known. For example, U.S. Pat. No. 4,437,751 describes a film transport mechanism in which a double sensor engages the end-of-film perforations of a filmstrip. The engagement of the sensor with the perforations causes a separate locking lever to be activated, prohibiting further advancement of the filmstrip. In addition, a separate button on the camera must first be depressed in order to retract the double sensor, for allowing subsequent rewind of the filmstrip into the film cartridge.

Though the above described double sensor provides a technique for detecting the end of the usable portion of the filmstrip, a separate mechanism is still required in order to stop the further advance of the filmstrip. In addition, it is necessary to cause retraction of the sensor in order to effectively rewind the filmstrip.

As evidenced by typical manual film advance systems, such as the one described above, discrete subsystems are necessary to coordinate the shutter release, the film advance and metering, and the film rewind mechanisms in the camera. These subsystems involve the use of many mechanical components which increase the size of the camera, or alternatively provide for combinations of mechanical and electrical driven components which significantly impact the cost of the camera.

There is a need to provide a manually operable metering mechanism for a photographic camera which is simple in design so as to effectively prevent further advancement of a filmstrip when metering, while allowing the filmstrip to be rewound without independent mechanisms being required for retraction of the metering mechanism.

There is a further need to provide a simple and reliable mechanical mechanism for a photographic camera which provides for automatic cooperation between film advance, shutter release and film rewind with a minimum number of components.

SUMMARY OF THE INVENTION

The present invention is directed to overcoming one or more of the problems set forth above. Briefly summarized, according to one aspect of the present invention, there is provided an apparatus for metering a filmstrip formed with at least one perforation for each film frame comprising a metering member configured to engage at least one perforation for each film frame to prevent movement of the filmstrip in a film advancing direction, and characterized in that:

said metering member includes cam follower means for contacting a trailing edge of one perforation for each film frame when the filmstrip is moved in a film rewinding direction, opposite to the film advancing direction, to cause the trailing edge to cam said metering member out of engagement with the perforation.

According to another aspect of the invention, there is provided an apparatus for metering a filmstrip formed with at least one perforation per film frame, comprising a metering member configured to engage at least one perforation for each film frame to prevent movement of the filmstrip in a film advancing direction, retraction means for moving said metering member out of engagement with at least one perforation for each film frame to allow movement of the filmstrip in the film advancing direction, and a lever element movable from a loaded position to a rest position, characterized in that:

the metering member includes cam follower means for contacting a trailing edge of one perforation for each film frame when the filmstrip is moved in a film rewinding mechanism, opposite to the film advancing direction, to cause the trailing edge to cam said metering member out of engagement with the perforation, and wherein said lever element includes means for engaging said retraction means when said lever element is moved from said loaded position to said rest position.

An advantageous aspect of the present invention is that a filmstrip can be advanced to be metered and also rewound while the metering apparatus is still in contact with the filmstrip, without having to separately retract the metering member.

A further advantageous aspect is that the metering member of the present invention provides an effective and simple mechanical system for preventing the premature advance of a filmstrip, without requiring separate and distinct locking mechanisms, such as to disable the film advancing knob of the camera. In this manner fewer parts are required, reducing manufacturing costs of the camera.

A still further advantageous aspect of the present invention is that the mechanism herein described provides maximum efficient use of the high energy lever to provide and coordinate a number of specific metering functions. That is, in a preferred embodiment of the present invention, the uncocking of the high energy lever coordinates the tripping of the shutter blade as is commonly known, but in addition also causes the shutter release button from being reactuated, thereby preventing double exposures of a film frame. The uncocking of the high energy lever also causes the coordinated retraction of a metering member to allow the filmstrip to be subsequently advanced. In addition, the design simplicity of the described metering mechanism also reduces the required size of a camera utilizing the present invention.

These and other aspects, objects, features and advantages of the present invention will be more clearly understood and appreciated from a review of the following Detailed Description of the Preferred Embodiments and appended Claims, and by reference to the accompanying Drawings.

DETAILED DESCRIPTION OF THE INVENTION

Figure 1:
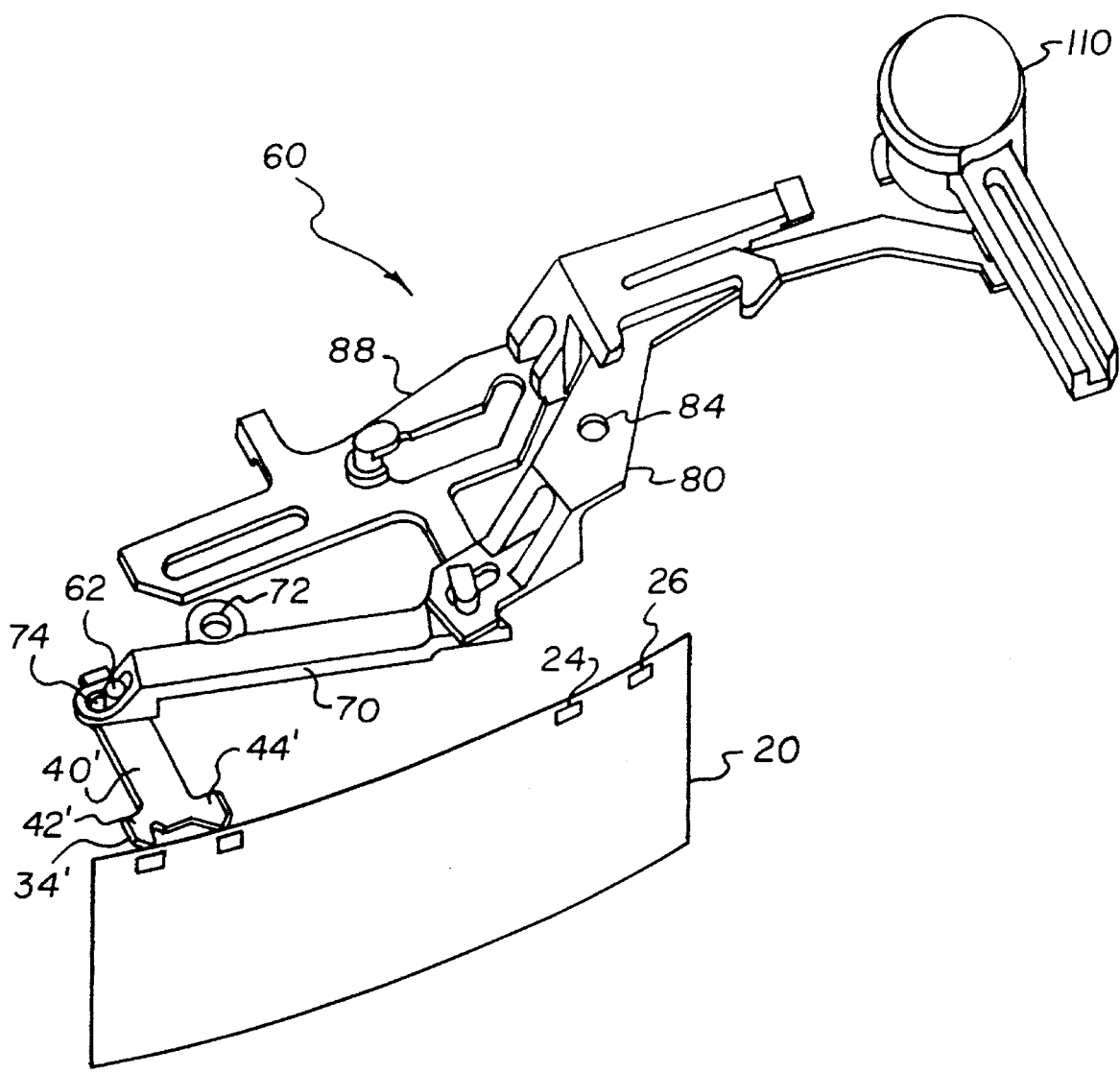
FIG. 1 is a partial isometric view of a metering apparatus according to a first embodiment of the present invention.

Referring now to FIG. 1, there is shown the major components of a metering mechanism 60 according to a preferred embodiment of the present invention.

The metering mechanism 60 includes a pivotable first linking member 70 having a slot 74 for attachment to a metering member or pawl 40 having an attachment pin 62. The first linking member 70 allows the metering meter 40 to be pulled out of engagement with a filmstrip 20 having multiple pairs of frame-defining perforations 24, 26 so as to allow the filmstrip 20 to be moved in the film advancing direction to a succeeding film frame after exposure. The first linking member 70 is mounted directly to an interior portion of the camera body 10, FIG. 3, and is pivotable about a first pivot point 72. The first linking member 70 is also connected to a second linking member 80, which is also fastened to the camera body 10, FIG. 3, so as to define a second pivot point 84 about which the second linking member separately rotates, as described below. The mechanism 60 further includes a high-energy lever 88 which is movable from a rest or initial position to a loaded or cocked position for release by the depression of a shutter release button 110. The above components and their interaction with one another will be described in greater detail below.

Figure 2:
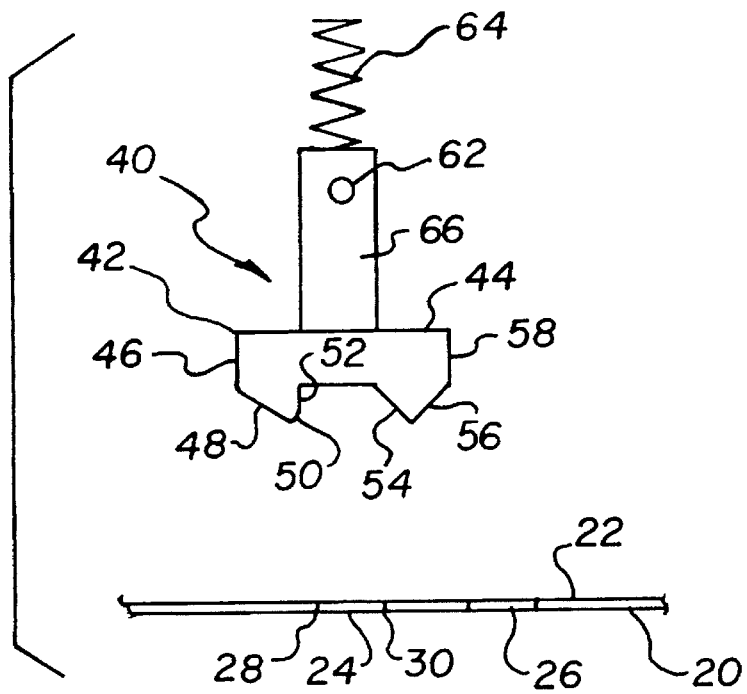
FIG. 2 is a partial top view of a metering member used in the metering apparatus of FIG. 1.
Figure 3:
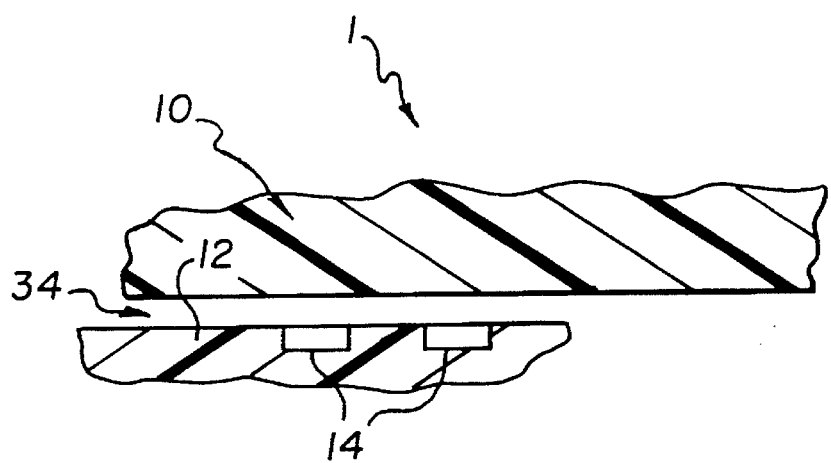
FIG. 3 is a partial top diagrammatic view of the back of a camera illustrating a portion of the film transform path relative to the rear cover.

Referring now to the diagrammatic FIG. 3, the above metering mechanism 60, FIG. 1, is housed within a camera body 10 (only partially shown) which additionally houses the major components of a camera 1 such as the taking lens, the film cartridge chamber, exposure gate, and the like. These features are commonly known in the photographic field, and do not form an essential part of the present invention. The camera 1 includes a rear cover 12 having a pair of inset surfaces or recesses 14. The spacing between the camera body 10 and the rear cover 12 defines a film track or plane 34 to allow passage of the filmstrip 20, FIG. 2.

An embodiment of the metering member 40 is now described with reference to FIG. 2. For purposes of the following discussion, the film plane 34, FIG. 3, is assumed to be substantially flat, or planar. A pair of adjacent engagement portions 42, 44 are configured for engaging with a pair of the previously described frame-registering filmstrip perforations 24, 26, respectively. Each of the perforations 24, 26 of the filmstrip 20 are further defined by a leading and a trailing edge 28, 30, respectively.

According to this embodiment, the first engagement portion 42 of the metering member 40 is defined by a leading sloped surface 48 which extends downwardly and rearwardly from a front face 46. The sloped surface 48 tapers to a slightly beveled and brief second surface 50 extending upwardly and rearwardly to a contact locking surface 52 which extends in a substantially upward configuration. The contact locking surface 52 is not limited to a strictly orthogonal orientation relative to the film plane 34, FIG. 3; in fact, providing a slight angle of about 2 to about 5 degrees is preferable to better allow film release on retraction of the metering member 40, though this angle can also be varied.

The second adjacent engagement portion 44 of the metering member 40 is defined by a pair of sloped surfaces 54, 56; a leading sloped surface 54 extending downwardly and rearwardly in a similar fashion to surface 48, and a trailing sloped surface 56 which extends upwardly and rearwardly from surface 54 defining an apex which serves as a single contact point for film surface 22, although the two surfaces could alternately have respective slopes so as create a planar surface (not shown) as opposed to an apex and without consequence to the effectiveness of the design of the metering member 40. It is advantageous for the defined apex to project deeper into the filmstrip 20 in order to lift the contact locking surface 52 over the leading edge 30 of the film on initialization, as shown in FIGS. 4(b) and 4(c).

As noted above, the above embodiment of the metering member 40 has been defined to correspond to the substantially flat film plane 34. Briefly referring to FIGS. 1 and 7, it can be seen that the design of the metering member 40' having engagement portions 42' and 44', is quite similar, though the overall contour of the metering member is curved to match the curvature of the film plane 34'; that is the first engagement portion 42' is inboard of the second engagement portion 44'. In either case, the engagement portions 42, 44 are configured to engage the filmstrip 20, depending on the particular film path.

Figure 4A:
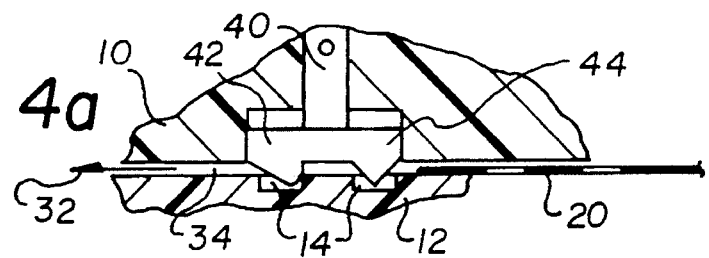
FIGS. 4(a)–4(d) are partial top views of the camera depicted in FIG. 3, illustrating the engagement of the metering member of FIG. 2 during the advancement of a moving filmstrip.
Figure 4B:
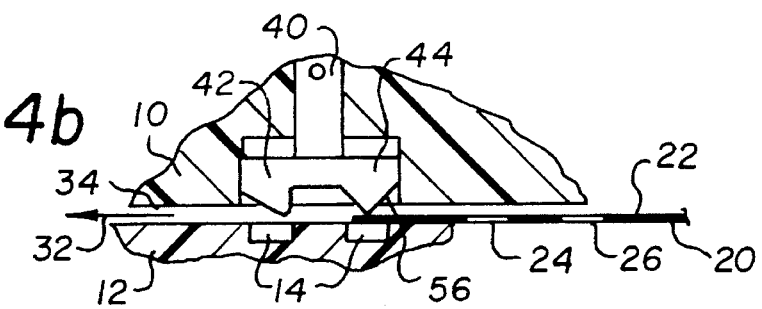
Figure 4C:
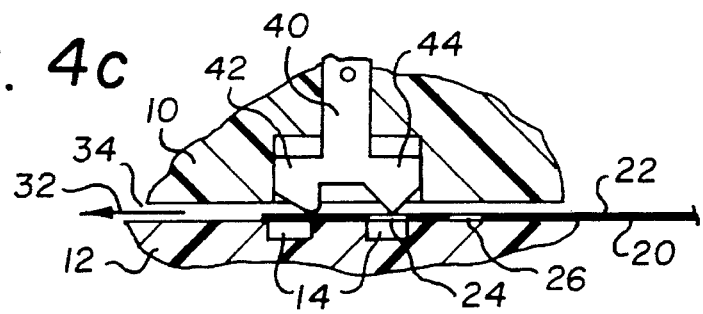
Figure 4D:
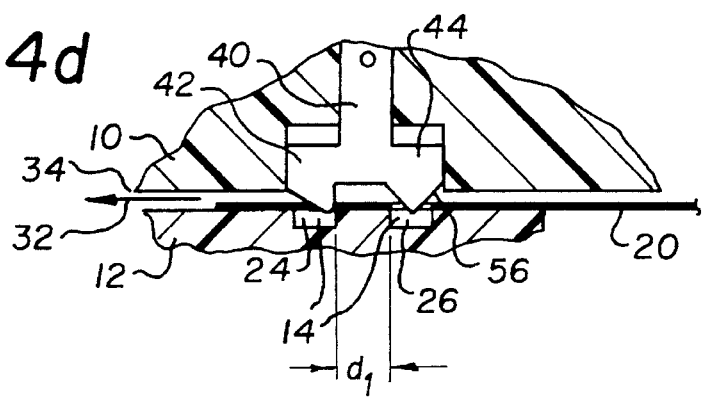

The first and second engagement portions 42, 44 of the metering member 40 are spaced apart a distance d1, FIG. 4(d) which is substantially equal to the distance between a pair of the adjacent frame registering perforations 24, 26.

Referring to FIGS. 2, 3 and 4(a)–4(d), the metering member 40 is attached within a cutout (not shown) of the camera body 10 and aligned across the film track 34, relative to the recesses 14 provided in the camera rear cover 12. Preferably, the metering member 40 is mounted to provide only axial movement into and out of the film plane 34. This can be accomplished by a number of conventional mounting schemes; for example, a pin (not shown) could be provided in a bottom surface of the metering member 40 to engage a slotted channel (also not shown) in the cutout portion of the body 10. It should be readily apparent that a number of equally effective axial mounts are available. The metering member 40 is mounted within the camera body 10, and is attached at one constrained end to a compression spring 64 which is rigidly fastened to the camera body. The compression spring 64 biases the metering member 40 into an engaged position as shown in FIG. 4(a).

For purposes of clarity, the operation of the metering member 40 will be described first in cooperation with a moving filmstrip, prior to a discussion of the interaction of the metering member 40 in cooperation with the remainder of the metering mechanism 60.

Referring specifically now to FIGS. 4(a)–4(d), the filmstrip 20 is advanced through the film track 34 of the camera 1 as depicted by arrow 32. As shown in FIG. 4(a), the metering member 40 is initially biased by the spring 64 into an engaged position so that the engagement portions 42, 44 are within the defined recesses 14 of the rear cover 12 and therefore across the film track 34.

As the leading edge of the filmstrip 20 engages and bears upon the second engagement portion 44, FIG. 4(*b*), and particularly sloped surface 56, the metering member 40 is forced axially out of engagement with the recesses 14, easily overcoming the biasing force provided by the spring 64, FIG. 2. As noted previously, the amount of biasing of the spring 64, FIG. 2, is relatively light, preferably less then 1 ounce of force, so as not to interfere with the filmstrip 20 as it traverses the film track 34 and remains effectively in contact with the metering member 40. As the filmstrip 20 continues to move in the advancing direction, arrow 32, the film surface 22 does not permit the engagement portions 42, 44 to pass therethrough and into the recesses 14.

Referring to FIG. 4(*c*), the filmstrip 20 is shown in a further advanced position along the film track 34 in which the leading perforation 24 is centered with the second engagement portion 44. Because the film surface 22 is still supported by the first engagement portion 42, however, the second engagement portion 44 does not drop into the perforation 24.

The filmstrip 20 continues to advance, FIG. 4(*d*), in the direction indicated by arrow 32, to a position at which a leading perforation 24 passes relative to the first engagement portion 42. Because, however, the second engagement portion 44 is still in contact with the surface 22 of the filmstrip, the metering member 40 does not engage the perforations 24, 26 until the trailing perforation 26 also passes relative to the second engagement portion 44, being guided by beveled surfaces 50, 56. Further movement of the filmstrip 20 in the film advancing direction, arrow 32, is restricted due to the positive engagement of the metering member 40 with the perforations 24, 26, and particularly the contact locking surface 52 which bears directly upon the trailing edge 30, see FIG. 5(*a*).

Figure 5A:
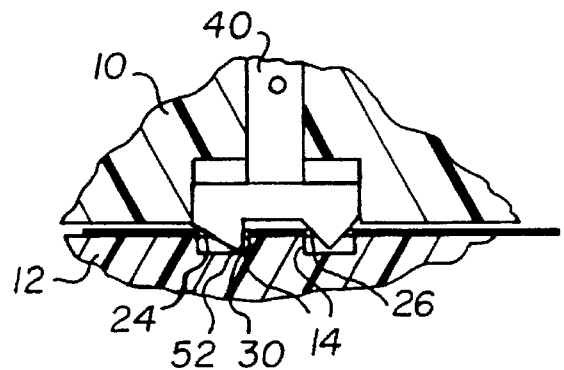
FIGS. 5(a)–5(c) are partial top views of the camera of FIG. 2 and 4(a)–4(d) illustrating the automatic disengagement of the metering member during the rewinding of the filmstrip.
Figure 5B:
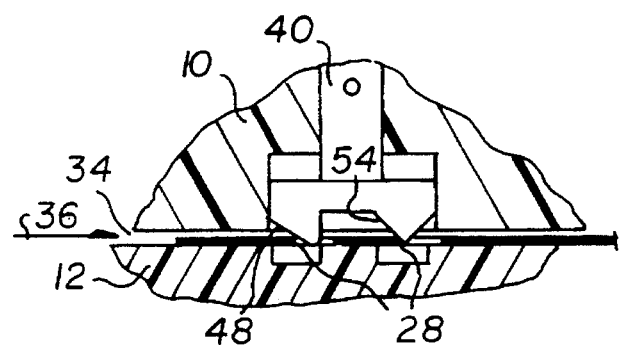
Figure 5C:
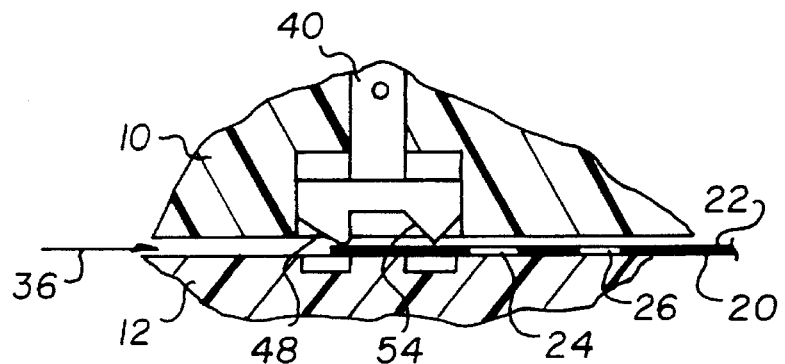

Referring now to FIGS. 5(*a*) through 5(*c*), the filmstrip 40 is rewound into the film cartridge (not shown) by the rotation of a film rewind knob (not shown) causing the filmstrip 20 to be moved in a direction, arrow 36, opposite to that of the film advancing direction, and along the film track 34. The technical aspects of rewinding a filmstrip into a film cartridge prior to unloading the cartridge from a camera are widely known in the field and require no further discussion since these features do not provide an essential part of the present invention.

Initially, as shown in FIG. 5(*a*), the metering member 40 is in a metered position with the contact locking surface 52 impinging on the edge 30 of the leading perforation 24 to prevent further film movement in the film advancing direction, arrow 32. As the filmstrip 20 is subsequently moved in the film rewinding direction, arrow 36 according to FIG. 5(*b*) along the film track 34, the edges 28 of the filmstrip perforations 24, 26 are each ramped along the cam surfaces 48 and 54 of the first and second engagement portions, 42, 44 respectively. This cam following action of the filmstrip 20 along the surfaces 48, 54 causes the metering meter 40 to be lifted from the recesses 14, that is, from the engaged position. The film surface 22 prevents reengagement with the recesses 14 until a subsequent pair of perforations 24, 26 appears, FIG. 5(*c*). It should be observed that a single cam surface could be used in lieu of the two cam surfaces 46, 54; that is, either of the cam surfaces 48 or 54 could sufficiently cam the metering member 40 from engagement with the filmstrip 20, given the relatively light amount of biasing force provided by spring 64, FIG. 2.

In order to move the filmstrip 20 in the film advancing direction, arrow 32, the metering member 40 must first be retracted from the filmstrip perforations 24, 26. A sufficient retraction time for the trailing edge 30 of the first perforation 24 to effectively clear the contact locking surface 52 is all that is required. The filmstrip 20 can then be advanced, arrow 32, until the engagement portions 42, 44 of the metering member 40 engage a subsequent pair of frame-registering film perforations 24, 26 for metering of the next film frame.

Prior to describing a preferred retraction means, further discussion must first be made as to the remainder of the metering mechanism 60. Referring now to FIGS. 6(*a*)–6(*f*) and 7, a supply gear 118 is provided having a pair of cam teeth 120 circumferentially disposed about the gear periphery. The supply gear 118 is directly connected to a film cartridge (not shown) preferably of the thrusting type, such as described by U.S. Pat. No. 4,948,063, hereby incorporated by reference, to cause the filmstrip 20 to be advanced into the curved film track 34' by rotation of a thumbwheel (not shown) on the camera body 10, as is conventionally known. In addition, a hook shaped portion 90 of the high energy lever 88 is sized to engage one of the cam teeth 120 as the supply gear 118 is rotated in a clockwise direction, such as by rotation of the thumbwheel (not shown) to allow the lever to be placed in a locked position, FIG. 6(*a*), when film is advanced along film track 34' Details as to the movement of the high energy lever 88 from and to a loaded position to and from an initial or rest position are described in greater detail below. FIG. 6(*f*) illustrates the high energy lever 88 in its rest or biased position.

The path of travel of the high-energy lever 88 between the rest position and the loaded position is established by a pair of slots 92, 94 which interface with a pair of pins 122, 124 extending from the camera frame 126. The lever 88 is biased into the rest position when released from the locked position by a tension spring 104, attached to the lever and the camera frame 126. The lever 88 also includes a pair of extending portions 96, 98 for tripping a shutter blade 116, and for contacting an angled end portion 79 of the first linking member 70, respectively as described in greater detail below. The high energy lever 88 also includes integral locking means for allowing the lever to be locked in the loaded position, according to FIG. 6(*a*). In the present embodiment, the locking means includes a cam portion 100 located on the underside 102 of the lever 88 which is sized to be drawn over a similarly ramped surface 108 of the camera frame 126 when the lever is drawn back via the thumbwheel (not shown). When the cam portion 100 of the lever 88 is drawn over the frame ramp 108, a cliff surface (not shown) of the cam 100 is pressed against a similar cliff surface (not shown) of the frame ramp 108, thereby locking the lever 88 against the biasing of the spring 104, until the shutter release button 110 is actuated, as described below.

Figure 7:
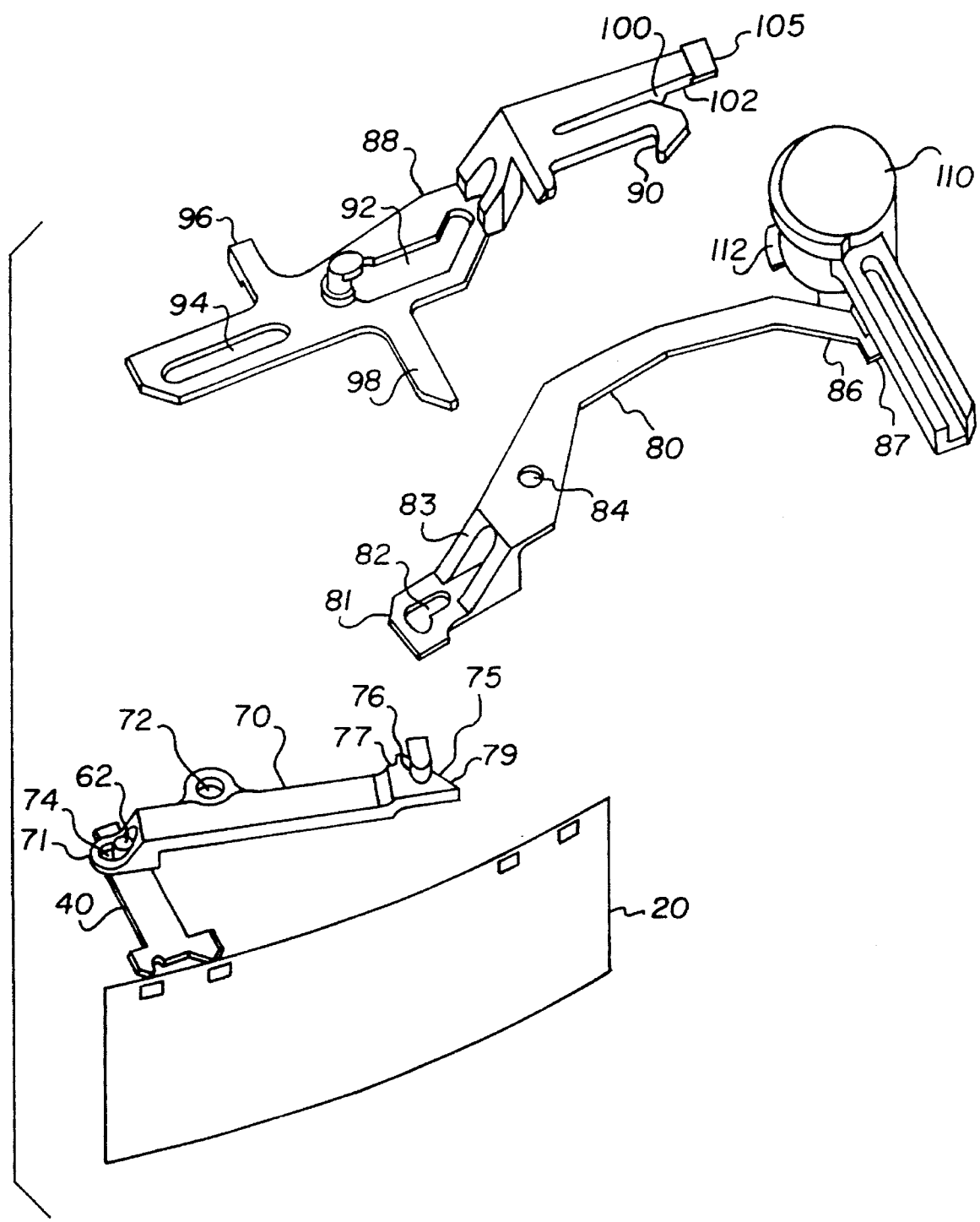
FIG. 7 is an enlarged exploded isometric view of components of the metering mechanism shown in FIG. 1.

The shutter release button 110 is preferably provided with a protruding tab 112, FIG. 7, which deflects a compliant cantilevered end portion 105 of the high energy lever 88 when the shutter button is depressed.

Turning to the remaining components of the mechanism 60, the second pivoting member 80 includes a slot 82 at one end 81 for retaining the pin 76 of the first linking member 70, a ramped portion 83 having a mount point 84 where the member is mounted to the camera frame 126, and an extended lockout portion 86 at a remaining end 87, the significance of which will be described below.

The first pivoting member 70 includes a slot 74 at one end 71 for engaging the pin 62 of the mounting member 40 and a pin 76 extending from a top surface 77 at the other end 75 for engaging the slot of the second linking member 80. The member end 75 includes an angled surface 79 for interfacing with the second extending portion 98 of the high energy lever 88, as described below.

As noted above, the metering member of this mechanism is similar to the one described in FIGS. 2–5, other than the overall contour of the engagement portions 42', 44', FIG. 1 correspond to the curvature of the film plane 34', thereby recessing the first engagement portion 42', FIG. 1 radially inboard relative to the second engagement portion 44', FIG. 1.

A preferred operation of the metering mechanism 60 is herein described with reference to FIGS. 6(a)–6(f). After the metering member 40' has engaged the filmstrip perforations 24, 26 in the manner previously described according to FIGS. 4(a)–4(d) and the high energy lever 88 has been moved to its cocked or loaded position, a film frame (not shown) is ready for exposure.

Figure 6A:
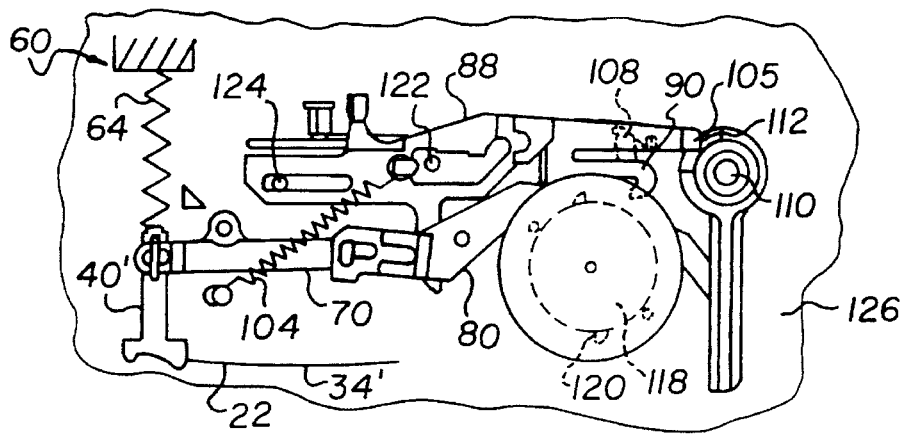
FIGS. 6(a)–6(f) are partially cut-away top views of the camera of FIG. 3, illustrating a preferred means of retracting the metering member in order to allow subsequent advance of the filmstrip.

Referring specifically to FIG. 6(a), the high energy lever 88 is released from its loaded position by the actuation of the shutter release button 110. As the button 110 is depressed, the protruding tab 112 contacts the cantilevered end portion 105 of the high energy lever 88 in an eccentric manner. Because the end portion 105 is preferably made from a compliant material, it deflects in a downward and outward fashion relative to the remainder of the lever 88. As the shutter button 110 reaches the completion of the stroke, the cantilevered end portion 105 springs away from the protruding tab 112, disengaging the cam portion 100 from the frame ramp 108. As this occurs, the lever 88 is immediately acted upon by the tension spring 104 which draws the lever 88 toward the rest position.

Figure 6B:
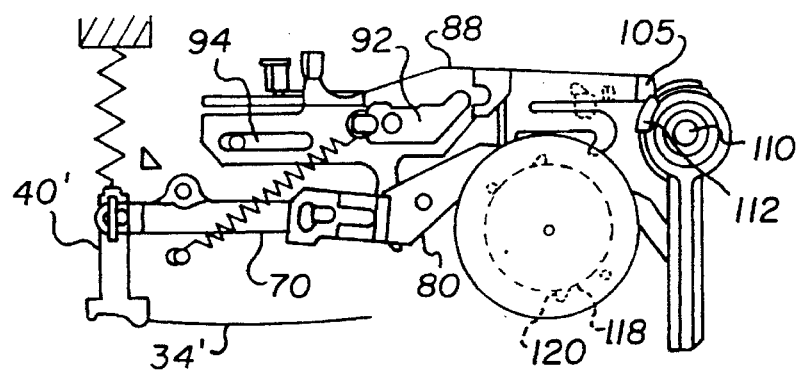
Figure 6C:
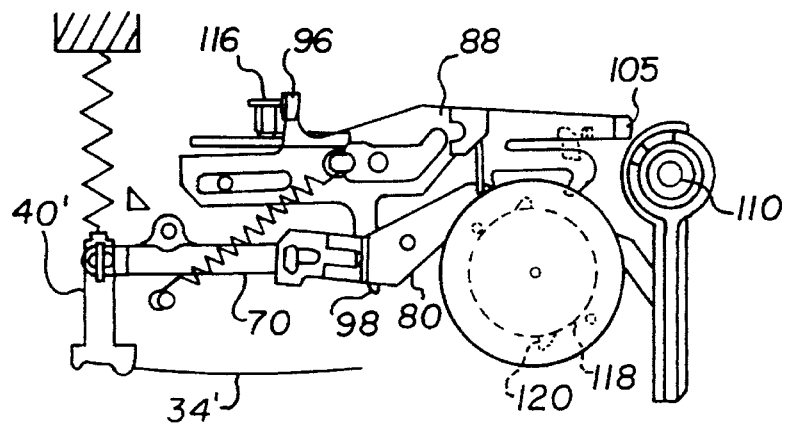
Figure 6D:
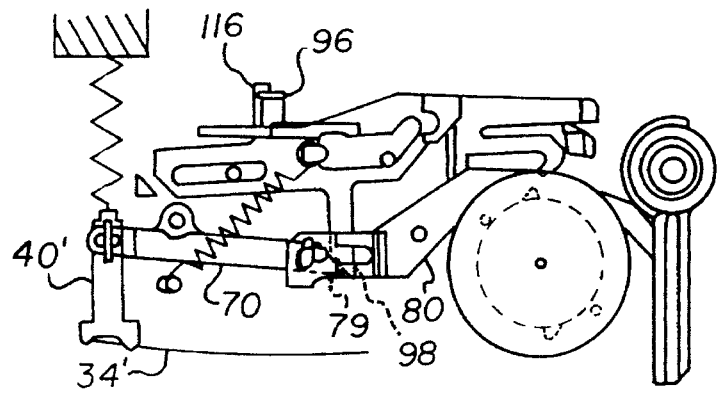

The lever 88 proceeds to travel along a rectilinear path defined by the slots 92, 94, FIG. 6(b), 6(c) wherein the lever 88 continues to move radially outward of the tab 112, also moving the hooked end 90 outward of the supply gear 118 and clear of the cam teeth 120 as the lever travels under the influence of the tension spring 104 until the first extending portion 96 trips the shutter blade 116, FIG. 6(c), (d). The slight outward (counterclockwise)rotation of the lever 88 causes the second extending portion 98 to align with the angled end portion 79 of the first linking member 70, FIG. 6(d) after the shutter blade 16 has been tripped by the first extending portion 96.

Figure 6E:
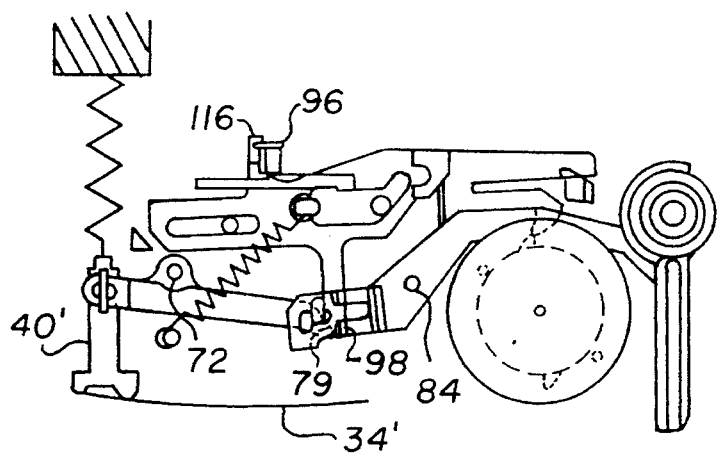

Contact with the angled surface 79 by the second extending portion 98 of the high energy lever 88 couples the movement of the high energy lever 88 to the first linking member 70 causing the first linking member to rotate in a clockwise direction about the first pivot point 72, FIG. 6(e). This rotation of the first linking member 70 in turn causes the metering member 40' to overcome the relatively low biasing force of the spring 64 so as to linearly retract from the perforations 24, 26 of the filmstrip 20 FIG. 6(f). This movement of the metering member 40' is directly attributable to the slotted connection between the first linking member 70 and the connecting pin 62 of the metering member 40'. Because the metering member 40' is held in a cutout portion (not shown) of the camera frame 126, the metering member 40' can only move axially, thereby retracting from the film track 34', FIG. 6(f).

Though a pivoting action of the linkage member 70 as herein described supplies the necessary force to overcome the biasing force of the spring 64, it should be readily apparent that other mechanisms can be used to linearly displace the metering member; for example, a hook shaped member (not shown) can be separately attached to the metering member and be responsive to the movement of the high energy lever 88.

At the same time, due to the connection of the pin 76 within the slot 82 between the second linking member 80 and the first linking member 70, the clockwise rotation of the first linking member 70 also causes the second linking member 80 to rotate clockwise about the second pivot point 84, FIG. 6(e). The rotation of the second linking member 80 positions the extending lockout portion 86 over the shutter release access hole 114, FIG. 6(f), blocking the shutter release button 110 from being reactuated a second time after the high energy lever 88 has been released, and preventing a double exposure of the filmstrip 20.

Figure 6F:
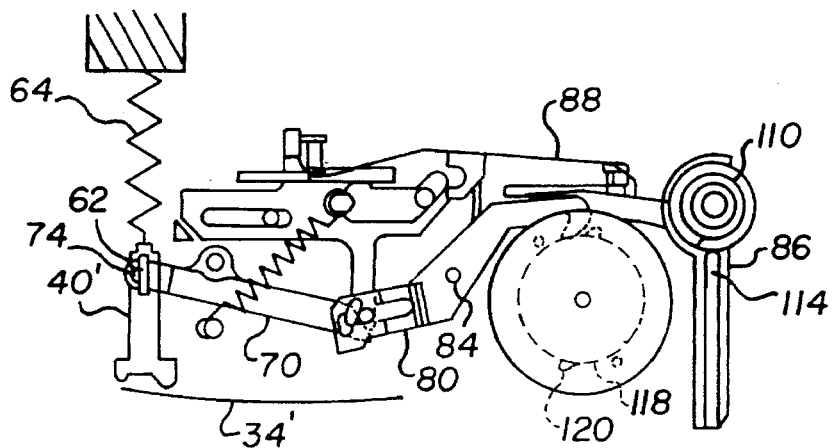

Following the release of the high energy lever 88 from its locked position, and according to FIG. 6(f), the filmstrip 20 can then be moved in the film advancing direction by rotation of the thumbwheel (not shown). As the film is advanced, the supply gear 118 rotates in the clockwise direction and one of the cam teeth 120 engages the hooked portion 90 of the high energy lever 88 for drawing the lever back to the locked position, FIG. 6(a) so that it can be locked as previously described. The loading of the high energy lever 88 along with the advancing of the filmstrip 20 also displaces the extending lockout portion 86 of the second linking member 80 away from covering the shutter access hole 174, so as to allow subsequent actuation of the shutter release button 110. Preferably, however, the shutter access hole 114 is not uncovered until the metering member 40' reengages with a pair of film perforations 24, 26. The movement of the extending lockout portion 86 allows each of the pivoting members 70, 80 to pivot about their respective pivot points 72, 84 to the positions shown in FIG. 6(a), with the metering member 40 again being biased by spring 64 into the engaged position across the film track 34'. The release of the high energy lever 88 then repeats the previous sequence.

In summary, the release of the high energy lever 88 not only provides a tripping action of the shutter blade 116, in a manner commonly known, but in addition provides, via the pivoting action of the linking members 70 and 80, a simple mechanical means for the metering member 40 to be retracted from the filmstrip 20, as well as means for preventing the shutter release button 110 from being reactuated, thereby preventing the possibility of double exposures.

The invention has been described with reference to a preferred embodiment. However, it will be appreciated that variations and modifications can be effected by a person of ordinary skill in the art without departing from the scope of the invention. For example, other filmstrips, having a plurality (N) of frame-registering perforations, can utilize a metering member having (N) engagement portions to lock the filmstrip so as to meter for exposure.

PARTS LIST FOR FIGS. 1–7

1 camera
10 camera body
12 rear cover
14 recesses
20 filmstrip
22 film surface
24 leading perforation
26 trailing perforation
28 edge 30 edge
32 arrow
34, 34' film track
32 arrow
40, 40' metering member
42, 42' first engagement portion
44, 44' second engagement portion
46 front face
48 cam surface
50 beveled engagement surface
52 contact locking surface
54 cam surface
56 beveled engagement surface
58 back face
60 metering mechanism
62 pin
64 compression spring
66 top surface
70 inking member
71 end
72 first pivot point
74 slot
75 end
75 pin
79 angled contact surface
80 second linking member
81 end
82 slot
83 ramped portion
84 pivot point
86 extending lockout portion
87 end
88 high energy lever
90 hooking portion
92 slot
94 slot
96 first extending portion
98 second extending portion
100 cam portion
102 underside
104 tension spring
105 cantilevered end portion
108 frame ramp
110 shutter release button
112 protrusion tab
114 access hole
116 shutter blade
118 supply gear
120 cam teeth
122 pin
124 pin
126 camera frame

I claim:

1. In a camera, a metering apparatus comprising:

a metering member having engagement means for engaging a filmstrip; and a high energy lever movable in opposing directions between a loaded position and a released position having engagement means for tripping a shutter mechanism when the lever is moved toward the released position, is characterized by:

a first linking member having means for contacting said high energy lever, said member being pivotably attached to said metering member for causing said metering member to disengage from said filmstrip when contacted by said high energy lever.

2. An apparatus according to claim 1, wherein only movement of the high energy lever toward the released position causes said lever to contact said first linking member to disengage the metering member from the filmstrip.

3. An apparatus according to claim 2, including a shutter release button which is actuatable to release said high energy lever from the loaded position and a second linking member pivotally attached to said first linking member having means for preventing actuation of the shutter release button while said metering member is disengaged from the filmstrip.

4. An apparatus according to claim 3, including a film supply gear having circumferentially disposed cam teeth engageable with said high energy lever to move said high energy lever from the released position to the loaded position when said film supply gear is rotated in a film advancing direction.

5. An apparatus according to claim 4, wherein said second linking member includes an extending portion which is movable to a blocking position to block the actuation of the shutter release button.

6. An apparatus according to claim 5, blocking member from said blocking position with said shutter release button when said high energy lever has been moved to the locked position.

7. An apparatus according to claim 6, wherein said metering member includes biasing means for biasing said metering member in a film engaging position.

* * * * *

UNITED STATES PATENT AND TRADEMARK OFFICE
CERTIFICATE OF CORRECTION

PATENT NO. : 5,555,053
DATED : September 10, 1996
INVENTOR(S) : Stanley W. Stephenson, III It is certified that error appears in the above-identified patent and that said Letters Patent is hereby corrected as shown below:

Column 10, Line 44,     after "An Apparatus according to Claim 5," insert --wherein said
Claim 6     high energy lever displaces said second--

Signed and Sealed this

Thirtieth Day of June, 1998

Attest:

BRUCE LEHMAN

Attesting Officer     Commissioner of Patents and Trademarks